May 30, 1967   A. J. SOLARI   3,322,431
SEALING ELEMENT FOR ROTARY MECHANICAL SEAL
Filed Nov. 29, 1963
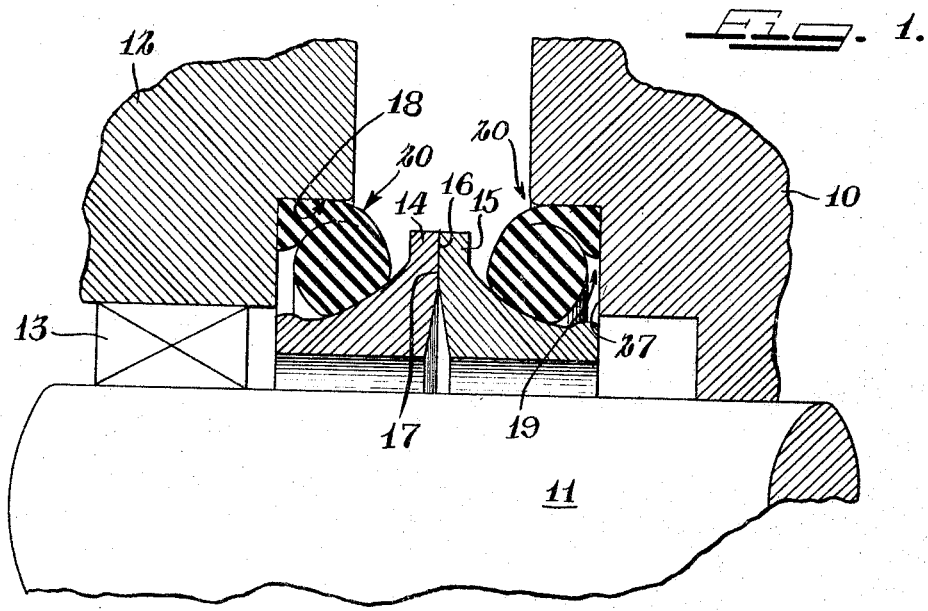
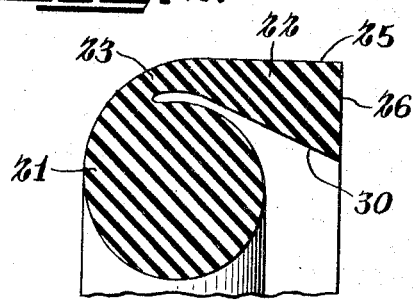
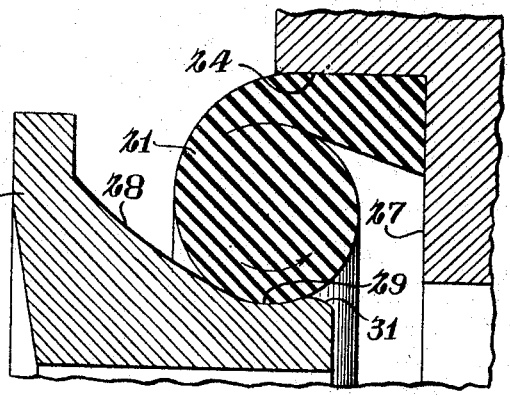
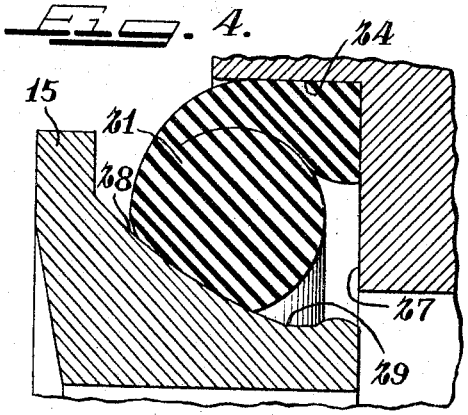
INVENTOR.
ARCHIE J. SOLARI
BY
Charles F. Voytech
Atty.

United States Patent Office 3,322,431
Patented May 30, 1967

3,322,431
SEALING ELEMENT FOR ROTARY
MECHANICAL SEAL
Archie J. Solari, Chicago, Ill., assignor to Crane Packing
Company, Morton Grove, Ill., a corporation of Illinois
Filed Nov. 29, 1963, Ser. No. 326,915
5 Claims. (Cl. 277—92)

This invention relates to rotary mechanical seals and particularly to a flexible sealing element to be used therein.

The principal object of this invention is the provision of a flexible sealing element for a two-piece rotary mechanical seal wherein the sealing element not only provides a fluid-tight seal between a sealing washer of the seal and a machine element associated therewith, but supplies a resiliently acting force for maintaining the sealing washer in contact with a cooperating sealing element with which the washer has a running, fluid-tight fit.

Another object of this invention is the provision of a sealing element for a two-piece rotary mechanical seal wherein the sealing element is made of an elastomeric material, so that it would normally tend to take a set when held under compression for an extended period of time, but which is so formed that pressure in any part of the element is not sufficiently great to result in a permanent set.

As further objects, this invention has within its purview the provision of a sealing element for a rotary mechanical seal wherein the element performs additionally the functions of a spring and of a drive for the sealing washer associated therewith; said element at the same time being inexpensive to make and install. It is also among the objects of this invention to provide a sealing element which is capable of resiliently supporting a sealing washer to protect the washer against severe abrasion and shock.

These and other objects of this invention will become apparent from the following detailed description when taken together with the accompanying drawings in which:

FIG. 1 is an axial quarter section through a rotary mechanical seal in which the sealing element of this invention is installed;

FIG. 2 is a radial cross-section through the sealing element in its uninstalled or free state;

FIG. 3 is a radial cross-section through a portion of the seal of FIG. 1, showing the condition of the sealing element of this invention in the initial stages of the assembly of the seal; and FIG. 4 is a radial cross-section through a portion of the seal of FIG. 1, showing the sealing element of this invention as it appears when the seal is installed and in operative condition.

One of the more severe applications for rotary mechanical seals encountered in industry is in sealing the bearings on the rollers used to support the track of the track-laying vehicle. Such vehicles are normally used off the paved roads and in locales where earth is being moved. The composition of the earth varies greatly from location to location, so that a given track-laying vehicle may at times be operating in sandy soil wherein the sand is picked up by the tracks and carried over the track rollers and over the areas where the bearings for the rollers are nomaily located. On other locations the earth may be a mixture of clay and humus, together with stone particles, which makes for a sticky conglomerate, tending to adhere to all parts of the track-laying apparatus, including the rollers for the track and their bearings. The uneven terrain traversed by such vehicles imposes severe shock loads on the tracks and upon their supporting rollers, and these shocks are, in turn, transmitted to the bearings and to such seal mechanisms as might be employed to keep dirt out of the bearings and retain lubrication in the bearings.

It is primarily for such severe applications that the seal element of this invention is designed, although, because of its low cost it can be applied with even greater assurance of success in seals operating in more favorable enviroments.

A typical rotary mechanical sealing arrangement for vehicles using track rollers is shown in FIG. 1. Because of the large number of rollers used on any given track-laying vehicle and the desirability of maintaining a minimum inventory of replacement seal parts, the stationary and rotary parts of the seal are preferably made substantially identical. Thus, as shown in FIG. 1, the track-laying vehicle may have a frame 10 on which is supported a stub shaft 11, said frame and shaft being substantially non-rotatable. Mounted for rotation on stub shaft 11 is a track roller 12, which is supported on said stub shaft 11 by a suitable lubricated bearing shown diagrammatically at 13. The space between frame 10 and roller 12 is exposed to the loose earth through which the vehicle moves and hence it is necessary to provide a seal for bearing 13 which will prevent such loose earth from entering the bearing and at the same time will prevent lubricant supplied to said bearing from becoming dissipated.

In the form chosen to illustrate this invention the seal for protecting bearing 13 is comprised of substantially identical metallic washers 14 and 15, both of which encircle shaft 11 and each of which is provided with a lapped face 16 and 17, respectively, by which said washers may be made to effect a running fluid-tight seal therebetween. Each metallic washer 14 and 15 is located a short radial distance from a cavity, such as 18 and 19 in track roller 12 and frame 10, respectively. Identical sealing elements of the novel form hereinafter to be described are interposed between the washers and the walls of their respective cavities to provide (a) a flexible seal between the washers and their respective cavities, (b) a means for preventing relative rotation between each washer and its respective cavity, and (c) resilient means for holding the washers in sealing engagement with one another. The said sealing elements are designated by the reference character 20.

The novel form of the sealing element 20 in radial cross-section and in its relaxed or free state is shown in FIG. 2. It is made of elastomeric material suitable for water and lubricants and is comprised essentially of an O ring 21, a sleeve 22 adapted to contact the walls of the seal cavity, and a relatively thin connecting section 23 which passes around a portion of the O ring 21 and is attached to, or made a part of it in a tangential direction. Sleeve 22 is thus formed with a cylindrical outer surface 25 and a frusto-conical inner surface 30, the smallest diameter of which is less than the outside diameter of O ring 21. It is contemplated that the sealing element will function by rolling the O ring portion 21 about the axis passing through the center of the circle defining the radial cross-section of the O ring and into the sleeve 22. In so doing, the O ring will engage the frusto-conical inner surface 30 of the sleeve and the sleeve will be compressed by the O ring against the outer cylindrical wall 24 of the cavity for the seal. As the O ring rolls, the flexible connecting section 23 is drawn inwardly and around the O ring section 21, and thus supplies a force which tends to restore said O ring section 21 to its relaxed position.

It is desirable that the sleeve portion 22 have a sealing fit with respect to its cavity, such as 19, and particularly with respect to the cylindrical wall (FIG. 3) 24 thereof. This is accomplished by forming the sealing element 20 initially with an outside diameter for the outer surface 25 of its sleeve portion 22, which is greater than the diameter of the cylindrical surface 24, thereby providing an initial loading of the sleeve portion 22 in the cavity 19. To effectuate the rolling of the O ring section 21 relative to the sleeve portion 22 it is necessary that said sleeve portion 22 be restrained in an axial direction and accordingly such section is provided with a radial wall 26 which abuts upon the radial wall 27 of the cavity 19. It is also necessary that an axial force be imparted to the O ring section 21 at a different radius from the smallest radius of sleeve portion 22 to generate a twisting force in the O ring section, and this is provided by the washer 15, said washer having a tapered wall 28 over which the O ring section 21 is adapted to be expanded. It is contemplated that the smallest diameter of the tapered section 28 will be greater than the smallest diameter of the O ring section 21 so that said O ring section will be given an initial expansion tending to compress it against the sleeve portion 22. Any tendency of the expanded O ring section to slide axially off the tapered section 28 during assembly of the seal, for example, is arrested by a peripheral bead 31 formed at the smallest end 29 of surface 28. The said sleeve portion will be thereby made to bear against wall 24 of the cavity 19 to form a seal therewith and to provide resistance against relative rotation between sealing element 20 and the walls of its cavity. Small end 29 forms with bead 31 a groove of relatively shallow depth into which the O ring section 21 contracts, thereby providing a means for holding washer 15 in assembled relation with respect to said sealing element 20 while both the washer and sealing element are inserted into a cavity 18 or 19.

FIG. 3 shows the seal washer and sealing element in the positions they assume when they are initially assembled with respect to a cavity, but before the track roller 12 and frame 10 are brought together axially to the operating positions shown in FIG. 1. In the axially free state, as illustrated in FIG. 3, some axial resilience is available in the sealing member, but it is not of a magnitude such as is normally required to hold the sealing washers 14 and 15 with their respective lapped faces 16 and 17 in contact with one another. The requisite axial pressure is developed when the washer is moved inwardly toward the cavity. This movement, as illustrated in FIG. 4, requires that the O ring section 21 ride up on the tapered surface 28 and down along frusto-conical surface 30, and in doing so its diameter must be expanded. The resistance to such expansion causes the O ring section 21 to move axially into the sleeve portion 22 with a rolling motion until it assumes the position shown in FIG. 4. The forepart of the sleeve portion 22, that is, the part 23 which connects the sleeve portion 22 to the O ring section 21, is brought radially inwardly to follow the rolling action of the O ring section 21, and it is under tension rather than compression. The radial outward expansion of the O ring section 21 results in a compression of the sleeve portion 22 against the cylindrical wall 24 of the cavity and helps effect a seal thereat as well as to provide a resilient reaction against such compression which is translated through the O ring section 21 and the tapered wall 28 into an axial force tending to hold the washers together as required.

As the washers wear, the resilience in the sealing members 20 urges the washers toward one another to take up for the wear and hence a continuous seal is effected, despite such wear.

Because of the extreme abrasion encountered in track roller seals, the materials of which the washers 14 and 15 are made is usually extremely hard and brittle. This renders the washers particularly susceptible to damage from shock and hence makes necessary a floating construction for the washers to insulate them from any shocks which might be transmitted to them from either the track roller or the track roller support. The design of sealing element 20 is such as to avoid any contact between the washers and any other metallic member of the equipment. This insures a complete insulation of the washers against damaging shocks and hence assures a long life for the washers.

The radial pressures developed between the sealing element 20 and the cavity (18 or 19, as the case may be) on the one hand and the sealing washer (14 or 15) on the other hand, is sufficient to inhibit relative rotation between the sealing member and its cavity and between the sealing member and the washer, so that relative rotation may be limited to sealing washers 14 and 15.

It may be apparent that for the preferred mode of operation of this invention it is desirable that a washer 14, 15 define with a wall 18, 19 of a cavity a tapered space, and that sealing element 20, as it rolls, develops a radial dimension between the washer and cavity wall which is greater than the radial dimension of the tapered space. Such proportion of parts results in the requisite compression of the sleeve portion 22 in the cavity to produce a seal, resilient reaction against the washer in an axial direction to keep faces 16 and 17 in sealing engagement, and the drive for the washer. It may also be apparent that instead of the washers entering cavities in their respective track rollers and frame, the parts may be reversed so that the washers are provided with cavities and the track roller and frame are provided with axial extensions, which telescope into the said cavities. The walls 24 of the cavities similarly need not be cylindrical but, as illustrated in FIG. 5, their shapes are determined by the radial dimension of the compressed sealing element and the shapes of the washer walls 28.

The sealing elements described above provide floating, cushioned supports for the brittle washers 14 and 15 and eliminate close tolerances in the formation of the cavities 18 and 19 and of the outer surfaces on washers 14 and 15. The build-up of pressure (i.e., the pressure per unit of axial movement) can be altered by altering the contour of the inner surface 30 of section 22, without changing the cavity or the sealing washer and hence seals with different characteristics can be provided for the same washer and cavity. The yielding nature of the section 22 permits true rolling of the O ring and a stretching of the connecting section 23 with a corresponding increased resilience over a pure O ring which does not have the sections 22 and 23 attached thereto.

It is understood that the foregoing description is merely illustrative of a perferred embodiment of the invention and that the scope of the invention therefor is not to be limited thereto, but is to be determined by the appended claims.

I claim:

1. A mechanical seal assembly comprising a sealing washer, a housing and an annular sealing element of elastomeric material for effecting a seal between the sealing washer and housing, said sealing washer being axially movable relative to said housing and said sealing washer and housing having opposed radially spaced walls defining in part an annular cavity having an original radial dimension in which said sealing element is disposed, said sealing element in radial cross section comprising a first part contacting one of said opposed walls, a sleeve part contacting the other of said opposed walls, and a flexible connection between the first part and the sleeve part, said sleeve part being of progressively greater thickness in an axial direction away from said flexible connection and having a cylindrical wall and a tapered wall radially removed from said cylindrical wall, said sleeve part being substantially fixed relative to the wall contacted thereby and said first part having a substantially circular surface rolling upon said tapered wall of said sleeve, the combined radial dimension of the first and sleeve parts becoming greater than the original radial dimension of the cavity as the circular surface of the first part rolls upon the sleeve part.

2. A mechanical seal assembly as described in claim 1, said first part in its free state having a substantially circular radial cross section.

3. A mechanical seal assembly as described in claim 1, the wall on the washer contacted by the first part of the sealing element being tapered in the same axial direction as the tapered wall on the sealing element.

4. A mechanical seal assembly as described in claim 1, said flexible connection between the first and sleeve parts of the sealing element being tangent to the radially outer region of the substantially circular surface on the said first part.

5. A mechanical seal assembly as described in claim 1, said sleeve part terminating in a radially disposed wall, said housing having a radially disposed wall contacting the said radially disposed wall on the sleeve to substantially fix the sleeve part to the wall contacted thereby as aforesaid.

References Cited
UNITED STATES PATENTS 3,125,347   3/1964   DeMoude _____ 227—92

LAVERNE D. GEIGER, *Primary Examiner.*

J. S. MEDNICK, *Assistant Examiner.*